(12) United States Patent
Robles-Flores et al.

(10) Patent No.: US 6,278,270 B1
(45) Date of Patent: Aug. 21, 2001

(54) APPARATUS AND METHOD FOR DETECTING SMALL DISTANCE CHANGES BETWEEN OPPOSED SURFACES USING GIANT MAGNETO RESISTANCE EFFECT SENSOR

(75) Inventors: Eliud Robles-Flores, Webster; Edward W. Schnepf, Ontario; Douglas A. Gutberlet, Macedon; Carl H. Hall, Shortsville; Randall C. Ryon, Victor; James B. Myers, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/430,307

(22) Filed: Oct. 29, 1999

(51) Int. Cl.[7] ............... G01B 7/06; G01B 7/14; B65H 7/06; B65H 7/12; B41J 13/02
(52) U.S. Cl. ........... 324/207.21; 324/226; 324/229; 324/231; 271/265.04
(58) Field of Search ............ 324/226, 229–231, 324/207.2, 207.21, 207.22, 207.26, 252; 73/159; 271/262, 263, 265.04; 335/205; 307/116, 117

(56) References Cited

U.S. PATENT DOCUMENTS

| | | |
|---|---|---|
| 4,692,700 | 9/1987 | Nix . |
| 4,767,987 * | 8/1988 | Montgomery ........................... 324/231 |
| 5,293,118 * | 3/1994 | Grossmann et al. .................. 324/229 |
| 5,373,235 * | 12/1994 | Clark, Jr. et al. ................. 324/229 X |
| 5,647,583 | 7/1997 | Emigh et al. . |
| 5,662,324 * | 9/1997 | Cannaverde et al. ................ 271/263 |
| 5,744,950 * | 4/1998 | Seefeldt ....................... 324/207.21 X |
| 5,929,631 * | 7/1999 | Striker et al. .................... 324/207.21 |
| 6,060,969 * | 5/2000 | Hufgard et al. ................. 335/205 X |

FOREIGN PATENT DOCUMENTS

| | | |
|---|---|---|
| A-2-187602 | 7/1990 | (JP) . |
| A-5-301657 | 11/1993 | (JP) . |

* cited by examiner

Primary Examiner—Gerard R. Strecker
(74) Attorney, Agent, or Firm—Oliff & Berridge, PLC (57) ABSTRACT

A device that can sense small changes in distance between opposed surfaces includes a ferromagnetic material and a giant magneto resistance effect sensor. A current source applies a current to the sensor to operate the sensor and read the magnetic field that impinges on the sensor from the ferromagnetic material. The magnetic field changes when the distance between the opposed surfaces changes. The device can be used in imaging apparatus to sense multifeeds and other conditions.

33 Claims, 8 Drawing Sheets

APPARATUS AND METHOD FOR DETECTING SMALL DISTANCE CHANGES BETWEEN OPPOSED SURFACES USING GIANT MAGNETO RESISTANCE EFFECT SENSOR

BACKGROUND OF THE INVENTION

1. Field of Invention

This invention relates to devices that can detect small changes in distance between opposed surfaces and methods of detecting small distance changes between opposed surfaces using the devices.

2. Description of Related Art

Imaging devices include, for example, electrophotographic and electro graphic printers, ink jet printers and thermal printers. In these devices, an imaging substrate is fed into a feed path and conveyed through the apparatus to an imaging station for imaging. Multiple imaging substrates, such as paper sheets, are typically stored in stacks in the imaging apparatus. The substrates are separated from each other so that individual substrates are fed into the feed path for imaging.

SUMMARY OF THE INVENTION

A problem that commonly occurs in imaging devices is multifeeds, i.e., multiple substrates that overlie each other being fed into the feed path simultaneously. Multifeeds are caused by adjacent sheets becoming attached. For example, stacks of paper sheets are formed by cutting. When the sheets are cut by a cutting element, edges of adjacent sheets can become attached to each other. If the sheets are not properly separated from each by a separating device of the imaging devices, then two or more sheets can be fed into the feed path as a multifeed. Multifeeds are also caused by electrostatic attraction between adjacent sheets caused by pressure or friction.

Multifeeds can cause various problems in imaging devices. Imaging devices can image sheets on either one side or on two opposed sides. Imaging devices can include single and tandem print engines for forming one and two-sided images, respectively. When multifeeds occur, sheets can pass through the apparatus without being imaged. In tandem print engine apparatus, when multifeeds occur, it is not possible to print on both opposed sides of a sheet and, thus, two-sided prints can not be formed. In addition, multifeeds can cause jams in the feed paths, requiring imaging to be stopped until the jam can be cleared.

Multifeeds can also occur in apparatus in which indicia, such as labels, are placed on substrates.

This invention provides devices that can sense small changes in the distance between opposed surfaces.

This invention separately provides apparatus that include the devices. The devices can be retrofitted in the apparatus or can be original components of the apparatus.

This invention separately provides apparatus that comprise paths for feeding substrates and devices according to this invention for sensing multifeeds of the substrates along the paths.

This invention separately provides apparatus comprising devices according to this invention to sense wear and/or contamination of component surfaces that contact substrates.

This invention separately provides apparatus that comprise devices according to this invention to sense that improperly sized substrates, such as those having an improper thickness and/or length, have been loaded into the apparatus. The substrates can have various different compositions and can be opaque or light transparent.

This invention also provides methods for sensing small changes in the distance between opposed surfaces.

This invention separately provides methods for sensing multifeeds in apparatus.

This invention separately provides methods for sensing wear or contamination of components in apparatus.

This invention separately provides methods for determining if improper substrates have been loaded into an apparatus.

In various exemplary embodiments, the devices that sense small changes in the distance between opposed surfaces according to this invention comprise a first surface, a second surface that is movable relative to the first surface, a ferromagnetic material (permanent magnet) operatively associated with the first surface or the second surface, and a giant magneto resistance (GMR) effect sensor operatively associated with the first surface or the second surface. Under an applied current, the sensor changes it's internal magnetic field coupling and resistivity according to changes in magnitude of the external field that impinges on the sensor from the ferromagnetic material. The magnitude of the external field F between the first and second surfaces is determined by the magnetic properties of the ferromagnetic material; it is also a function of the distance d between the ferromagnetic material's center and a position of interest or location of the sensor. The device senses changes in the distance between the first and second surfaces caused by these surfaces moving relatively toward or away from each other. The changes in the sensor's internal magnetic field and resistivity can be correlated to the change in distance between the first and second surfaces.

The devices according to this invention can be utilized in various applications in which small distance changes between opposed surfaces indicate a change in some condition or that a problem has occurred. The devices are particularly advantageous for use in an imaging apparatus. The devices can be placed in the feed paths of the imaging apparatus to detect substrate feeding problems, including multifeeds and the feeding of improperly sized substrates. The devices can also be used in imaging apparatus for other purposes, such as to detect wear and/or contamination of surfaces.

In various exemplary embodiments, methods of this invention comprise applying a current to a giant magneto resistance effect sensor in the presence of an external magnetic field to cause the sensor to change it's internal magnetic field coupling and resistivity according to changes in magnitude of the external field that impinges on the sensor from the ferromagnetic material when a first surface moves relatively toward or away from a second surface, such as, for example, when an object passes between the first and second surfaces. The changes in the sensor's internal magnetic field and resistivity are correlated to changes in the distance between the first and second surfaces, which in turn can be correlated to a dimension of the object.

These and other features and advantages of this invention are described in or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, in which.

DETAILED DESCRIPTION OF PREFERRED EMBODIMENTS

This invention provides devices that can detect small changes in distance between surfaces, and also apparatus that include the devices. Exemplary embodiments of the devices of this invention can be used in various applications in which changes in distance between surfaces indicate that some condition has changed. For example, a distance change between surfaces can indicate that more than one object, each of the same dimensions, are disposed between the surfaces. A distance change can also indicate that an object is disposed between the surfaces that has a dimension that is either larger or smaller than some nominal value of that dimension. The distance change can also indicate that there has been wear of a member thus changing the distance between that member and another member. The distance change can also indicate that a substance, such as a contaminant, is on a surface of a member, thus changing the apparent distance between that member and another member.

An exemplary use of the devices according to this invention is in imaging apparatus that comprise paths for conveying substrates for imaging, or for attaching indicia such as labels on the substrates. The devices can be used in these apparatus for various purposes including, for example, sensing multifeeds of the substrates, improper substrate dimensions, wear and/or contamination of components, and other conditions, along the feed paths.

The devices are particularly advantageous for use in imaging apparatus in which substrates are conveyed along the feed paths to imaging stations to form images on the substrates. Exemplary embodiments of devices according to this invention will be described below with respect to such imaging apparatus.

In an imaging apparatus, substrates can be imaged on either one side or on two opposed sides. Such an imaging apparatus can include single and tandem print engines for forming one and two-sided images, respectively. During the operation of imaging apparatus, multifeeds can occur due to electrostatic attraction between the sheets, adhesion between the sheets, and other causes. Consequently, jams can occur along the feed paths, requiring the apparatus to be stopped until the jams can be cleared. In addition, when multifeeds occur, substrates can pass through the apparatus without being imaged. In tandem print engine apparatus, when multifeeds occur, it is not possible to print on both of the sides of a substrate and, thus, two-sided prints can not be formed.

This invention provides devices that can be used in an imaging apparatus to sense the occurrence of multifeeds to reduce feed path jams, to reduce the occurrence of non-imaged substrates, and enhance two-sided print efficiency in a tandem print engine imaging apparatus.

The devices according to this invention can also be used in imaging apparatus to sense the wear and/or contamination of surfaces that contact the substrates. Thus, the devices can be used to alert operators that the imaging apparatus needs servicing.

The devices according to this invention can also be used in an imaging apparatus to sense that improperly sized substrates have been loaded into the apparatus for imaging. For example, the devices can used to sense that the substrates do not have the proper thickness and/or length. Thus, operators can be alerted that different sheets need to be loaded into the apparatus, thus reducing waste.

Figure 1:
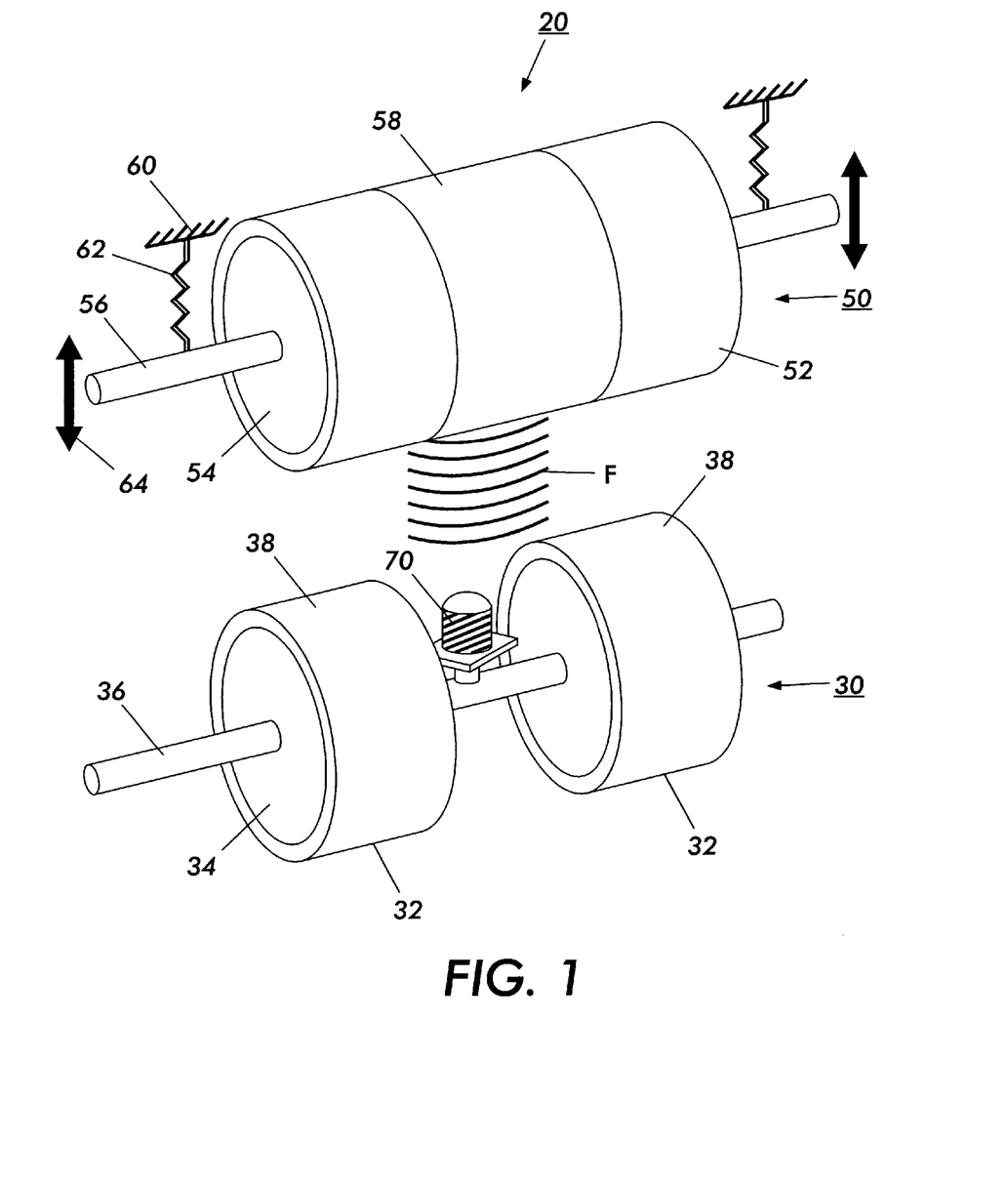
FIG. 1 illustrates a first exemplary embodiment of a sensing device according to this invention.

FIG. 1 illustrates a first exemplary embodiment of a device 20 that senses changes in distance between two opposed surfaces according to this invention. The device 20 comprises a first member 30 and a second member 50. The first member 30 comprises a pair of rollers 32, including bearings 34, mounted on a shaft 36. The rollers 32 each have an outer surface 38.

The second member 50 comprises a roller 52 including a bearing 54 mounted on a shaft 56. In the first exemplary embodiment shown in FIG. 1, a ferromagnetic material 58 is provided on at least a portion of the roller 52. The second member 50 is movably connected to a supporting surface 60 by an elastic element 62, which enables the second member 50 to move relative to the surface 60, as indicated by the arrow 64, such that the second member 50 can move toward or away from the first member 30. The roller configuration shown in FIG. 1 can be, for example, a center register roller configuration, located near the center of the feed path in an imaging apparatus.

Although the first member 30 is fixed in the exemplary embodiment shown in FIG. 1, the second member 50 can alternatively be fixed while the first member 30 is movable relative to the second member 50. For example, the first member 30 can be connected to a supporting surface using an elastic element, such as the elastic element 62.

The device 20 comprises a sensor 70 that is positioned to sense an external magnetic field F that impinges on the sensor 70 from the ferromagnetic material 58. The sensor 70 is mounted to the shaft 36 in a manner to allow the shaft 36 to rotate relative to the sensor 70, while the sensor 70 remains stationary.

Figure 2:
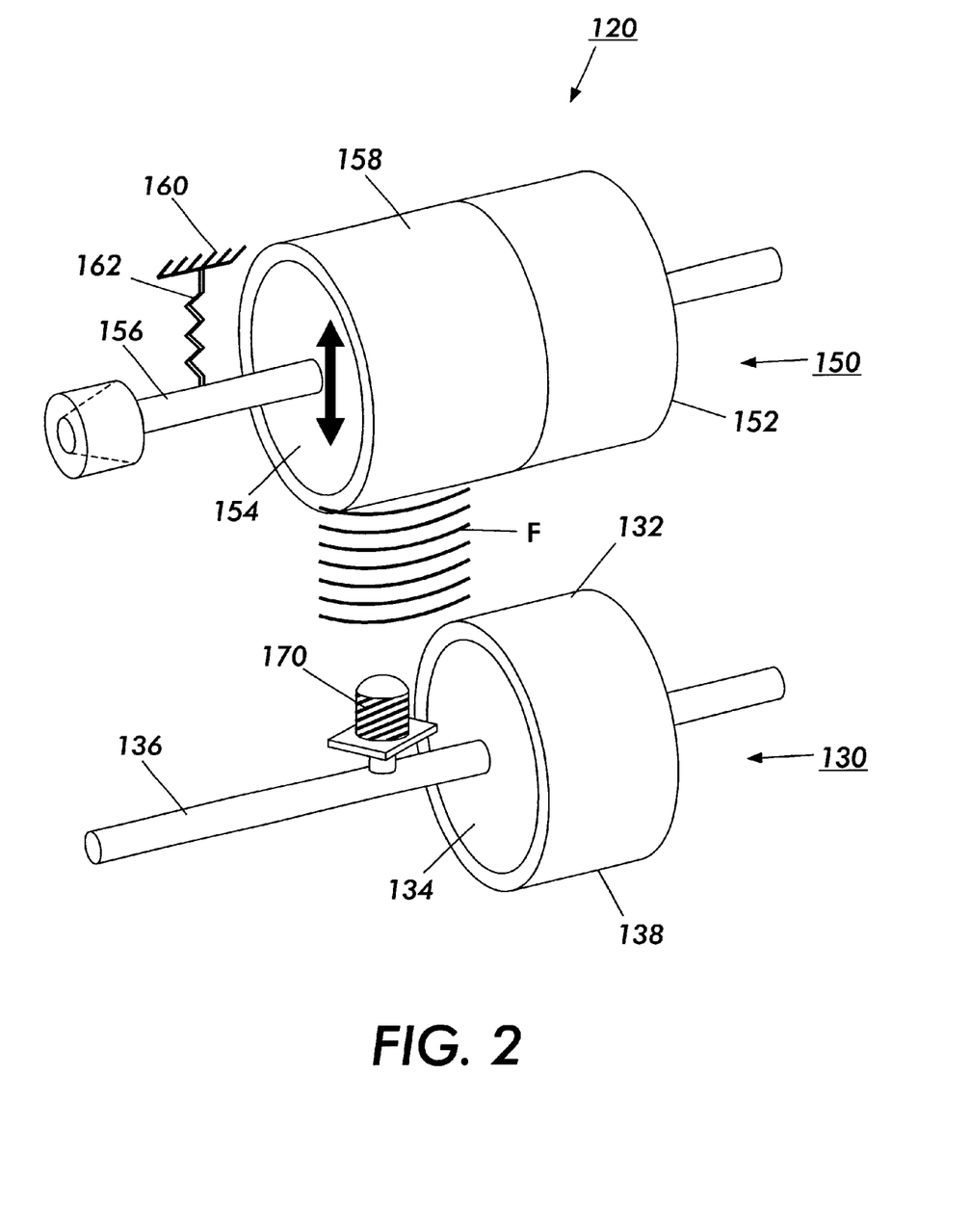
FIG. 2 illustrates a second exemplary embodiment of a sensing device according to this invention.
Figure 3:
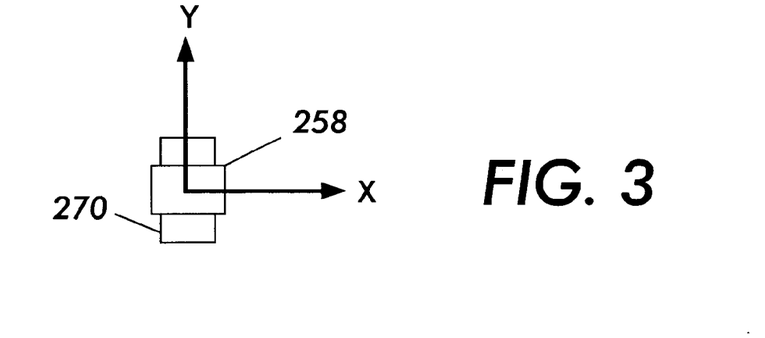
FIGS. 3 and 4 are respective top and side views illustrating a first exemplary configuration of a first ferromagnetic material having a cylindrical shape relative to a giant magneto resistance effect sensor.
Figure 4:
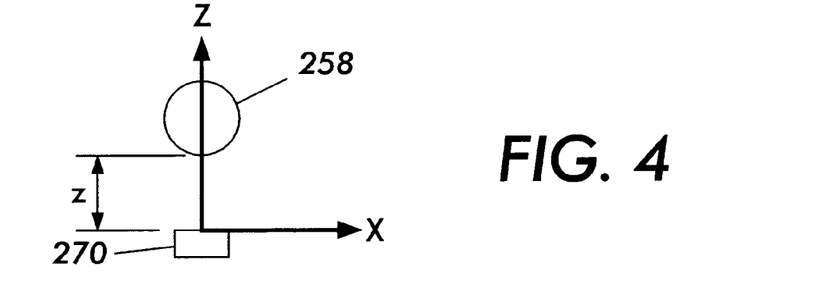

FIG. 2 illustrates a second exemplary embodiment of a device 120 according to this invention. In this second exemplary embodiment, a first member 130 comprises a single roller 132 having a surface 138. The roller 132 includes bearings 134 and is mounted on a shaft 136. A sensor 170 is located next to the roller 132. The sensor 170 senses the external magnetic field F that impinges on the sensor 170 from a ferromagnetic material 158 provided on a second member 150, which is mounted on shaft 156. The second member 150 is movably connected to a supporting surface 160 by an elastic element 162, which enables the second member 150 to move relative to the surface 160, as indicated by the arrow 164, such that the second member 150 can move toward or away from the first member 130.

The device 120 can be provided in, for example, an edge register roller configuration, which is typically disposed near the edge of the feed path in an imaging apparatus. This allows for quick service and easy retrofit of the device under any situation. Alternatively, a center register roller configuration, such as that shown in FIG. 1, is placed near the center of the feed path.

In various exemplary embodiments of the devices 20 and 120 according to this invention, the sensors 70 and 170 are sufficiently sensitive to detect small changes in the distance between opposed surfaces. In the device 20, the sensor 70 can detect changes in the distance between the surfaces 38 and the ferromagnetic material 58. In the device 170 shown in FIG. 2, the sensor 170 can detect changes in the distance between the surface 138 and the ferromagnetic material 158.

An exemplary type of sensor that has a sufficiently high sensitivity to sense small distance changes is a giant magneto resistance (GMR) effect sensor. In a GMR effect sensor, very thin magnetic and non-magnetic but conductive films are interleaved to produce a magnetic field antiferromagnetically coupled between adjacent magnetic layers, which in turn produces a high resistance (due to electron scattering) when a current is applied to the sensor. When an external field is applied to this arrangement, such as by a ferromagnetic material, the magnetic field between adjacent magnetic layers aligns with the external field in a parallel configuration, decreasing the resistivity of the current flow. A change in the external field due to the movement of the ferromagnetic material with respect to GMR effect sensor, such as caused by changes in the distance between the sensor 70 or 170 and the ferromagnetic material 58 or 158, induces a change in the internal magnetic field coupling and resistivity of the GMR sensor. These changes in resistivity are reflected as linear changes in the voltage output of the sensor. The magnetic field F of a ferromagnetic material is related to the distance d between the sensor and the ferromagnetic material as:

$$F \propto 1/d^3.$$

According to this relationship, even very small changes in d can significantly change, i.e., increase or decrease, the magnetic field F, enabling the sensor 70 or 170 to sense very small distance changes between opposed surfaces.

The ferromagnetic material 58 or 158 of the devices 20 and 120 can be any suitable ferromagnetic material. For example, the ferromagnetic material 58 and 158 can be a transition metal such as cobalt, nickel or iron; a rare earth element; a metal alloy comprising transition and/or rare earth elements; a ceramic material; a magnetic rubber material, and the like. Exemplary suitable ferromagnetic materials include barium ferrite, strontium ferrite, and aluminum-nickel-cobalt materials.

The ferromagnetic materials 58 and 158 can be provided in any suitable form on, or associated with, the second member 50 or 150. For example, the ferromagnetic materials 58 and 158 shown in FIGS. 1 and 2, respectively, have a ring configuration. The ring of ferromagnetic material 58 or 158 is sized to fit over the rollers 52 or 152, respectively. The ring of ferromagnetic material 58 or 158 can be bonded to the roller 50 or 150 using any suitable bonding technique. The ring of ferromagnetic material 58 or 158 can also be shrink fitted onto the roller 50 or 150. In various exemplary embodiments, the outer surface of the ferromagnetic material 58 and 158 is approximately flush with the outer surface of the roller 52 and 152, respectively, so that the outer surface of the roller 52 and 152 makes proper contact with substrates that pass between the first member 30 or 130 and the second member 50 or 150 during imaging.

Alternatively, the ferromagnetic materials 58 and 158 can be formed as a coating on a substrate such as the roller 52 and 152, respectively. The coating can be formed by any suitable coating technique that can apply ferromagnetic materials onto a substrate. The coating can be applied to any suitable substrate material including plastics, metals or ceramics. An exemplary method of coating the substrate comprises forming an electroplated ferromagnetic material layer on a substrate by electroplating.

In other exemplary embodiments of the devices according to this invention, the ferromagnetic material is not formed on or over the member having a surface that moves toward or away from another surface. For example, referring to FIG. 1, the ferromagnetic material 58 can be provided on the shaft 56. In such exemplary embodiments, the sensor 70 is suitably positioned to sense a magnetic field that impinges on it from the ferromagnetic material 58, such that distance changes between the selected surfaces of the respective first and second members 30 and 50 can be sensed. In such exemplary embodiments, the ferromagnetic material 58 can have various configurations, including rectangular, cylindrical, square, or other suitable shapes.

The sensors 70 and 170 can be mounted at any suitable location of the first member 30 and 130, respectively. For example, the sensor 70 can be mounted on the shaft 56 between the rollers 32, as shown in FIG. 1, or on the shaft 136 adjacent to the roller 132, as shown in FIG. 2.

However, in other exemplary embodiments, the sensor can alternatively be mounted to some other member in the apparatus in which the device is installed.

Figure 5:
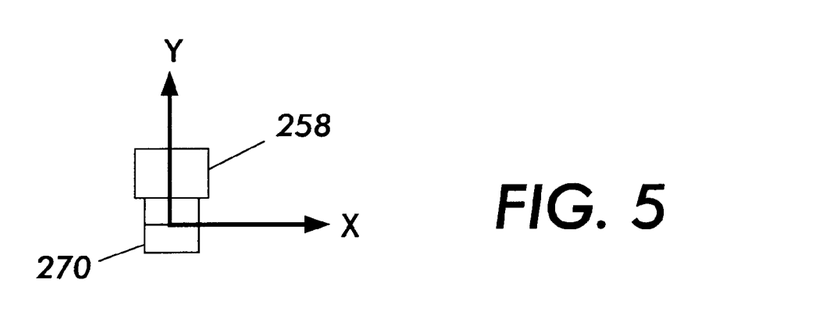
FIGS. 5 and 6 are respective top and side views illustrating a second exemplary configuration of the first ferromagnetic material relative to the giant magneto resistance effect sensor.
Figure 6:
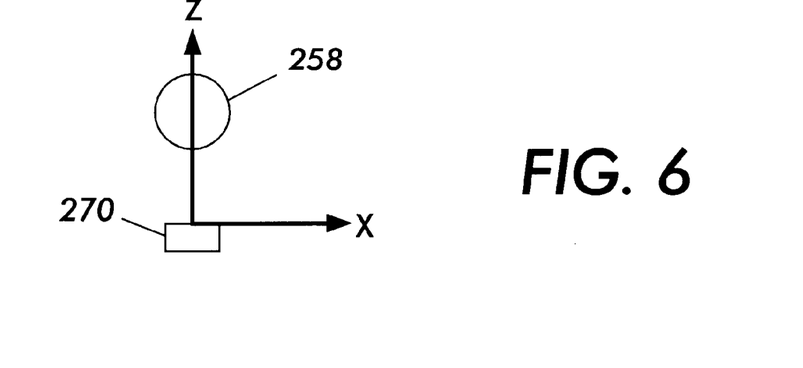
Figure 7:
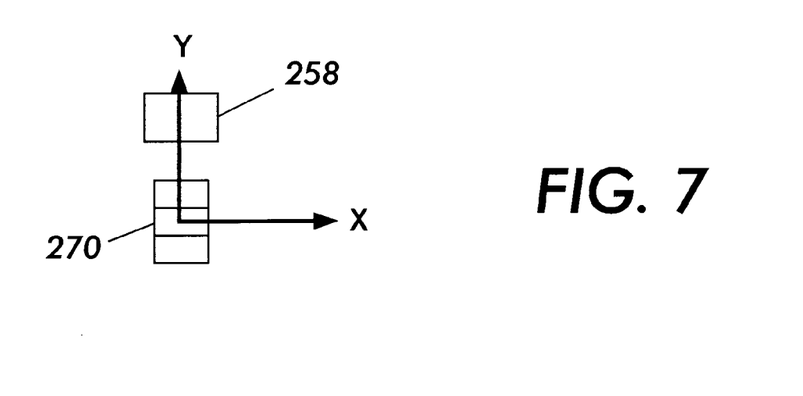
FIGS. 7 and 8 are respective top and side views illustrating a third exemplary configuration of the first ferromagnetic material relative to the giant magneto resistance effectsensor.
Figure 8:
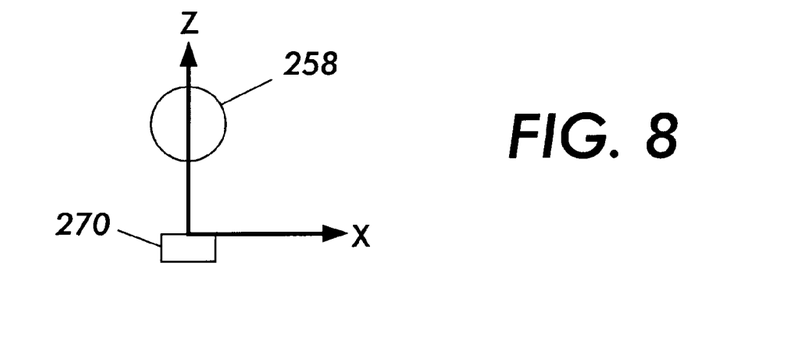

In still other exemplary embodiments of the devices of this invention, the position of the ferromagnetic material can be varied with respect to the sensor. FIGS. 3–12 show different exemplary configurations of ferromagnetic materials relative to a fixed sensor. FIGS. 3 and 4, 5 and 6, and 7 and 8, respectively, show respective top and side views of three different configurations of a cylindrical shaped ferromagnetic material 258 relative to a sensor 270. As shown, the position of the ferromagnetic material 258 along the y-axis corresponding to the longitudinal axis of the sensor 270 is varied. In the configuration shown in FIGS. 3 and 4, the ferromagnetic material 258 is approximately centrally located along the length of the sensor 270. In FIGS. 5 and 6, the ferromagnetic material 258 is located along the y-axis near an edge of the sensor 270. In FIGS. 7 and 8, the ferromagnetic material 258 is located along the y-axis near outward from the edge of the sensor 270, such that surfaces of the ferromagnetic material 258 and the sensor 270 do not directly overlie and face each other.

Figure 9:
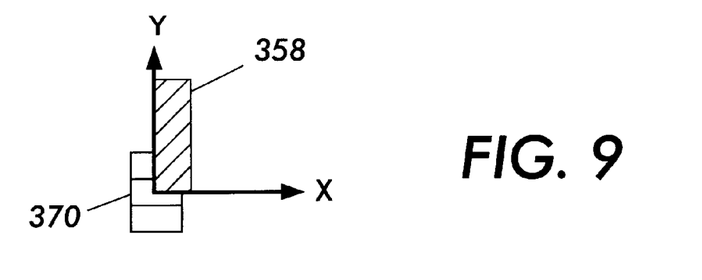
FIGS. 9 and 10 are respective top and side views illustrating a first exemplary configuration of a second ferromagnetic material having a rectangular shape relative to the giant magneto resistance effect sensor.
Figure 10:
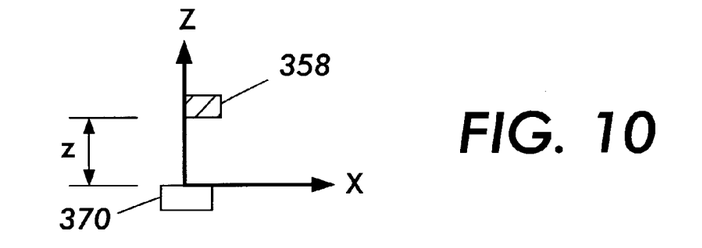
Figure 11:
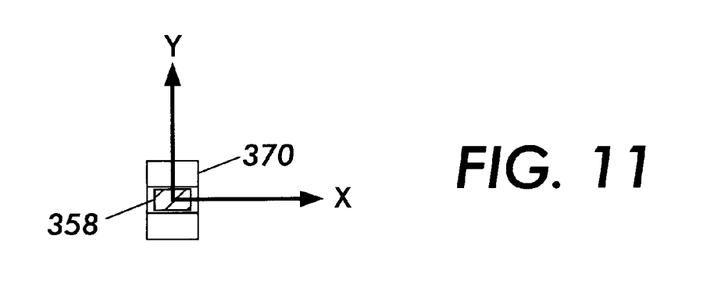
FIGS. 11 and 12 are respective top and side views illustrating a second exemplary configuration of the second ferromagnetic material relative to the giant magneto resistance effect sensor.
Figure 12:
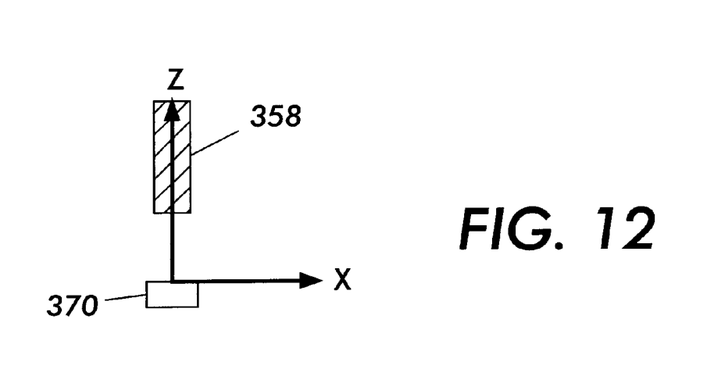

FIGS. 9 and 10, and 11 and 12, respectively, each show respective top and side views of two different configurations of a rectangular shaped ferromagnetic material 358 relative to a sensor 370. In FIGS. 9 and 10, the ferromagnetic material 358 is oriented parallel to, and offset in the x-axis direction from, the sensor 370. In FIGS. 11 and 12, the ferromagnetic material 358 is oriented vertically along the z-axis, approximately above the center of the sensor 370 along the y-axis.

In tests conducted by the inventors of this invention, two giant magneto resistance (GMR) effect sensors having different sensitivities were used in combination with the ferromagnetic material configurations shown in FIGS. 3–12. The giant magneto resistance (GMR) effect sensors 270 and 370 were Model Nos. AA005-02 and AA002-02 manufactured by NVE Inc. of Eden Prarie, Minn., having respective sensitivities of 0.45–0.65 mV/V/Oe and 3–4.2 mV/V/Oe. The ferromagnetic material 258 shown in FIGS. 3–8 had a composition of barium-ferrite and strontium-ferrite. The ferromagnetic material 358 shown in FIGS. 9–12 had a composition of aluminum-nickel-cobalt.

The test results indicated that the configuration shown in FIGS. 7 and 8 provided the largest range of movement of the ferromagnetic material 258 in the z-axis direction (about 2.7 mm) over which the response sensitivity of the giant magneto resistance effect sensor 270 was above a desired value of about 220 mV/mm. The increased range provides increased adjustability in the placement of the ferromagnetic material 258 and the sensor 370. The increased range also allows distance changes to be sensed for objects such as substrates having increased thickness. The configuration shown in FIGS. 5 and 6 provided a range of movement of the ferromagnetic material 258 in the z-axis of about 2.1 mm.

For the rectangular ferromagnetic material 358 shown in FIGS. 9–12, the configuration shown in FIGS. 11 and 12 provided the highest range of movement of the ferromagnetic material 358 in the z-axis direction. This range is about 1.6 mm over which the response sensitivity of the giant magneto resistance effect sensor 370 was above about 220 mV/mm.

It will be understood by those skilled in the art that the configurations shown in FIGS. 3–12 are exemplary only. Other suitable configurations of the ferromagnetic material and the giant magneto resistance effect sensor can also be used, in which any changes on the external magnetic field from the ferromagnetic material will make the internal magnetic field coupling of the sensor realign with it in a parallel manner, changing the sensor's resistivity and voltage output accordingly.

In various exemplary embodiments of the devices according to this invention, the devices can detect changes in distance between surfaces as small as about 0.01 mm leading to sensor outputs around 2000 mV/mm. This thickness is ten times less than the thickness of sheets, such as Xerox 4020-20# paper, typically used in imaging apparatus. These sheets typically have a thickness of about 0.1 mm. Thus, the devices are sufficiently sensitive to sense multifeeds of paper in imaging apparatus.

Figure 13:
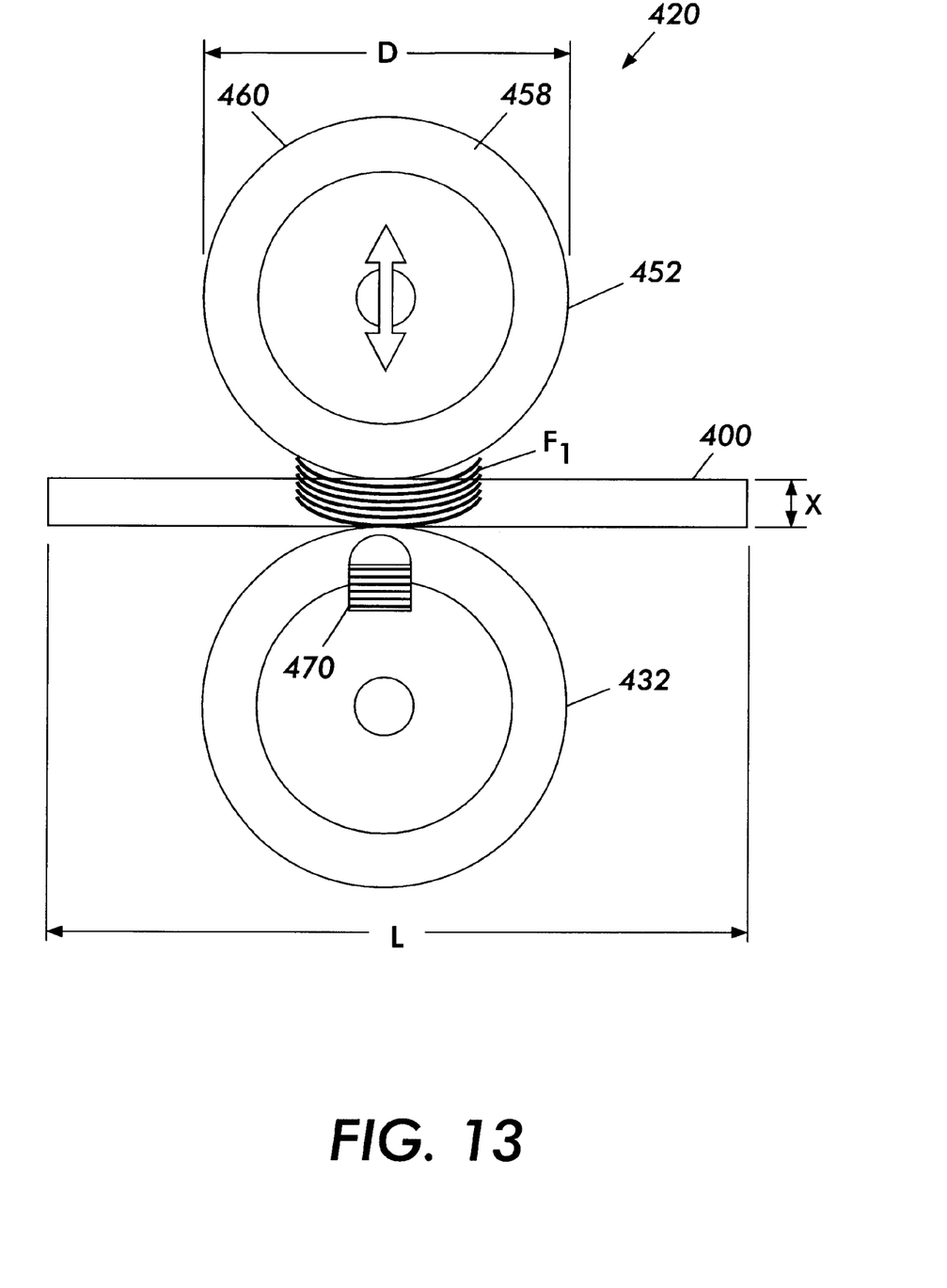
FIG. 13 is a side view of an exemplary embodiment of a sensing device according to this invention showing the separation between the first and second members during the passage of a single substrate between the members.

An exemplary embodiment of a method of sensing distance changes between surfaces will be described with reference to FIGS. 13 and 14, which show device 420. FIG. 13 shows a single substrate 400 passing between an upper roller 452 comprising a ferromagnetic material 458 forming at least a surface region 460 of the upper roller 452, and a lower roller 432. The substrate 400 can comprise paper, cardboard, plastic or some other material. Typically, the upper roller 452 and the lower roller 432 contact each other when the substrate 400 is not located between them. The upper roller 452 and/or the lower roller 432 can be resiliently biased so that the substrate 400 causes the upper roller 452 and the lower roller 432 to be separated from each other when the substrate 400 passes between them.

A sensor 470, preferably a giant magneto resistance (GMR) effect sensor, is positioned to sense a magnetic field $F_1$ that can pass through the substrate 400 from the ferromagnetic material 458 located on the opposite side of the substrate 400. When a single substrate 400 passes between the upper roller 452 and the lower roller 432, the magnetic field $F_1$ has a value that can be correlated to the distance between the upper roller 452 and the lower roller 432. Because this distance corresponds to the thickness x of the substrate, the magnetic field $F_1$ can be correlated with the substrate thickness.

Figure 14:
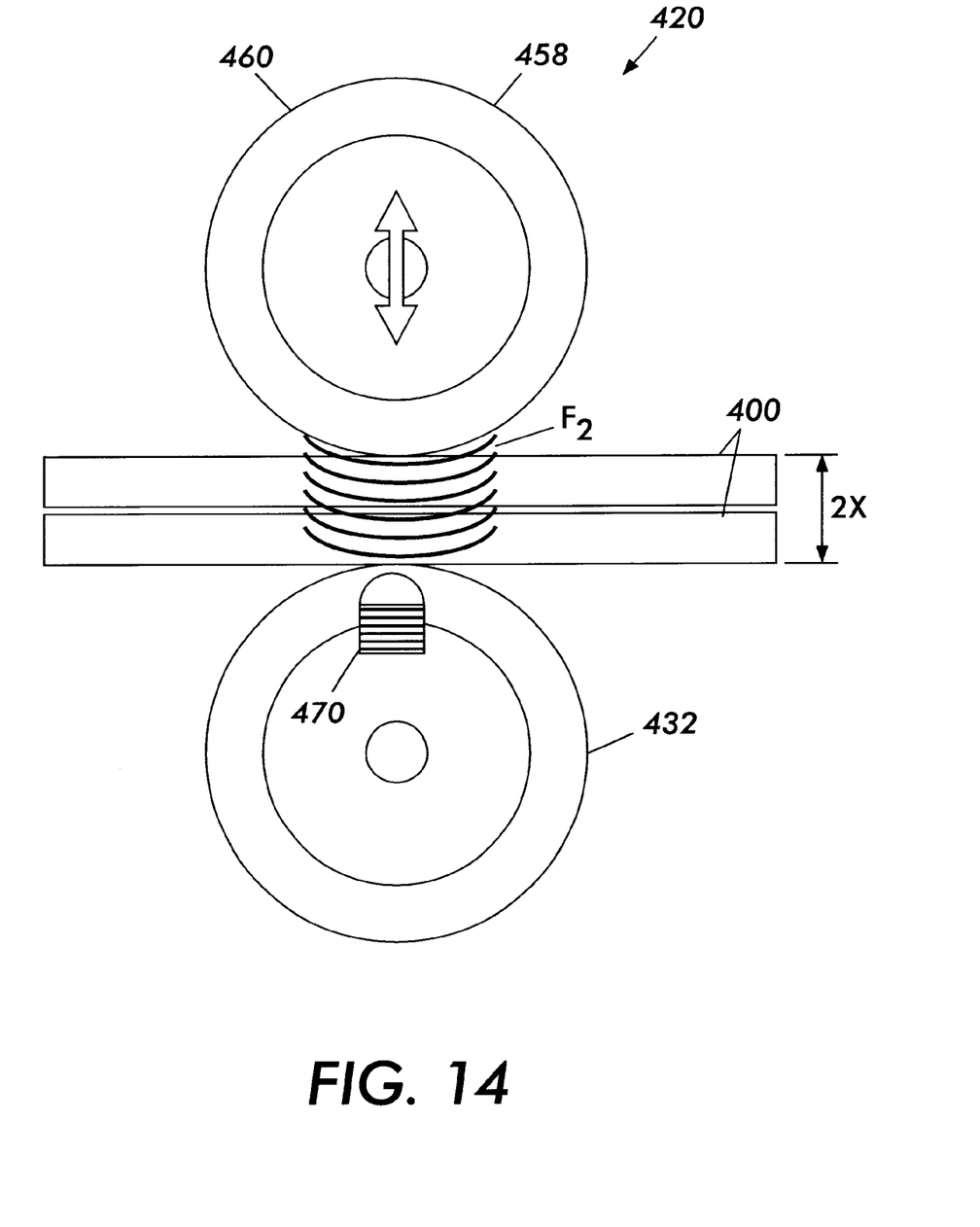
FIG. 14 is a side view of the sensing device of FIG. 8 showing the increased separation between the first and second members during the passage of a multifeed, including two substrates, between the members.

FIG. 14 shows a multifeed where two of the substrates 400 pass between the upper roller 452 and the lower roller 432. The multifeed causes the distance between the upper roller 452 and the lower roller 432 to be increased to a distance 2x, which equals the total thickness of the two substrates 400. The magnetic field $F_2$ read by the sensor 470 is consequently decreased to a value equal to ⅛ $F_1$. Thus, the sensor 470 has sufficient sensitivity to enable the occurrence of multifeeds to be readily sensed.

As described above in accordance with the various exemplary embodiments of the methods of this invention, the devices can be used to sense that improper substrates have been loaded into an apparatus. For example, referring to FIG. 13, when the substrate 400 having a thickness x is disposed between the upper roller 452 and the lower roller 432, the magnetic field F read by the sensor from the ferromagnetic material equals $F_1$. If a single substrate 400 having a thickness that differs from x is passed between the upper roller 452 and the lower roller 432, the magnetic field F increases or decreases, depending on whether the substrate 400 thickness is greater or less than x. If the thickness of the substrate 400 exceeds x and equals x+Δx, then the magnetic field emitted by the sensor 470 decreases to a value $F_{x+\Delta x}$, which is less than $F_1$. If the thickness of the substrate 400 is less than x and equals x−Δx, then the magnetic field emitted by the sensor 470 is increased to a value $F_{x-\Delta x}$, which is greater than $F_1$.

Because the resistivity and internal magnetic coupling of giant magneto resistance (GMR) effect sensors is extremely sensitive to the separation between the sensor 470 and a ferromagnetic material 458, the sensors can detect very small differences in thickness Δx of the substrates. As stated above, giant magneto resistance (GMR) effect sensors can detect changes in distance between surfaces as small as about 0.01 mm. This distance is about 10% of the thickness of a typical sheet of paper used in imaging apparatus. Thus, these sensors can sense an improper sheet thickness of sheets that varies by as little as about 10% from a typical sheet thickness.

As stated above, other exemplary embodiments of the devices according to this invention can also be used to sense improper object lengths. Referring to FIG. 13, the object 400 has a length L. Accordingly, the entire object can pass between the rollers in an amount of time t given by: t=L/f, where f is the feed rate (distance/time) of the object 400 between the upper roller 452 and the lower roller 432. Thus, when the object 400 of length L passes between the rollers at the feed rate f, the magnetic field read by the sensor 470 has a value F for the amount of time t. After the object has passed through the upper roller 452 and the lower roller 432, the upper roller 452 and lower roller 432 move toward each other and the magnetic field changes due to the decrease in separation between them.

If an object 400 of the same thickness, but having a length either longer or shorter than L, passes between the upper roller 452 and the lower roller 432, then the magnetic field F corresponding to the thickness of that object 400 will be read for an amount of time greater than t, when the object length exceeds L, or for an amount of time less than t, when the object length is less than L. The devices according to this invention accordingly allow improper object lengths to be sensed by comparing the amount of time that the magnetic field of the value F is read to a predetermined amount of time that corresponds to an object having the desired length L.

As stated above, various exemplary embodiments of the devices according to this invention can also be used to sense the wear of component surfaces. Referring to FIG. 13, the upper roller 452 has an outer diameter of D. As the outer surface 460 of the upper roller 452 wears, the outer diameter of the upper roller 452 decreases by an amount ΔD. This decrease in the outer diameter of the upper roller 452 decreases the distance between the outer surface 460 of the upper roller 452 and the sensor 470. Thus, the magnetic field F read by the sensor 470 increases. Accordingly, the device 420 can sense wear of the upper roller 452 based on this change in the magnetic field when the wear causes a change in the outer diameter of the upper roller 452 that is within the sensitivity of the sensor 470.

As stated above, various exemplary embodiments of devices according to this invention can also be used to sense the presence of contaminants on component surfaces. Referring to FIG. 13, if contaminants are present on the outer surface 460 of the upper roller 452, the distance between the outer surface 460 and the sensor 452 increases by an amount equal to about the depth of the contaminants on the outer surface 460. Consequently, the magnetic field F read by the sensor 470 decreases. Accordingly, if the contaminant depth is within the sensitivity of the sensor 470, then by comparing the magnetic field read by the sensor 470 in a clean condition of the outer surface 460 of the upper roller 452, to the magnetic field read by the sensor 470 after operation of the device 420, the presence of contamination on components, such as rollers in an imaging apparatus, can be sensed.

Figure 15:
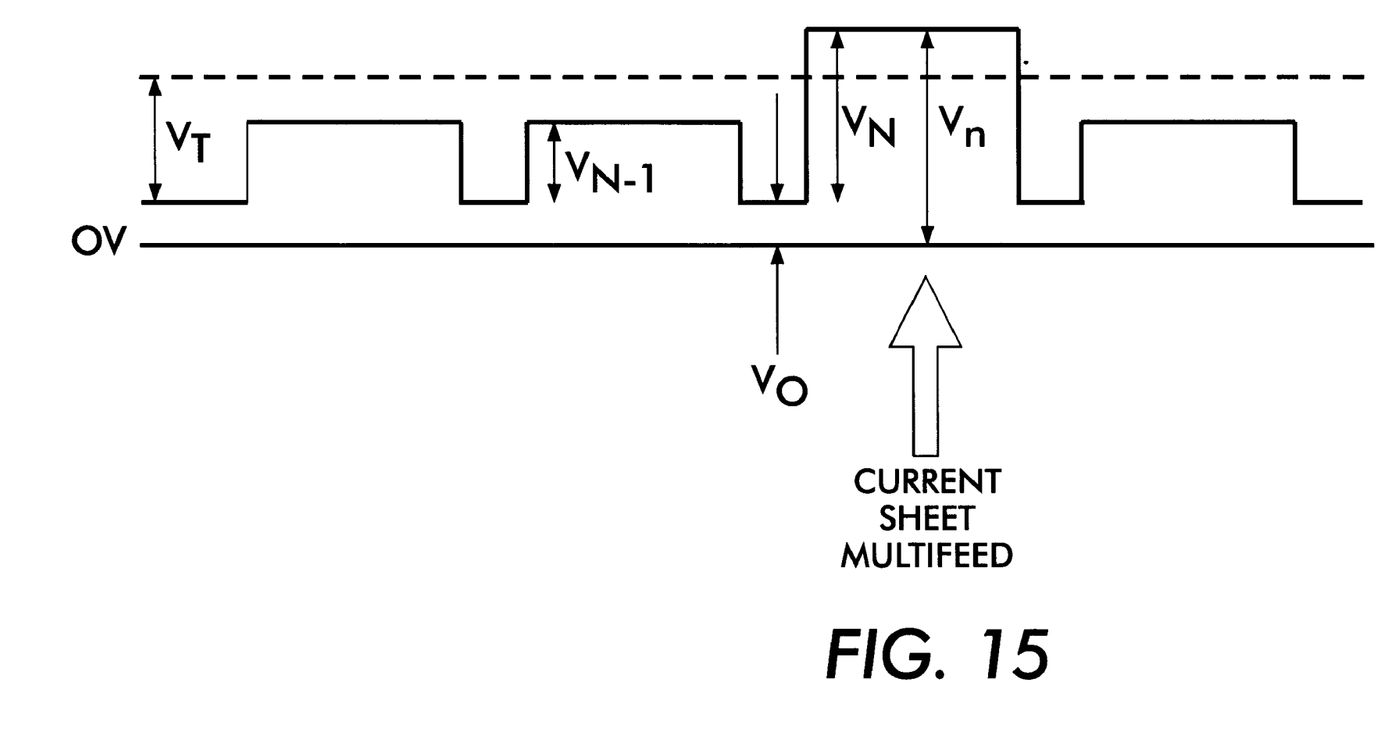
FIG. 15 illustrates an exemplary operation algorithm of embodiments of the sensing devices according to this invention.

Even though wear and contaminants can be measured by the sensor 470, this will not affect the ability of the sensor 470 to detect multifeeds if a proper algorithm is implemented. Referring to FIG. 15, the sensor 470 gives a voltage output proportional to the substrate thickness. When no substrate is present, the output voltage is $v_0$. When a substrate is present, the output voltage is $v_n$. The actual substrate thickness $V_N$ is:

$$V_N = V_n - V_0$$

Some exemplary cases are:

a) If $V_N > (V_T = X \cdot V_{N-1})$, where X is a factor larger than one determined from testing, then there is a multifeed.

b) At any time t, if wear of a component has occurred, the distance between the sensor and the ferromagnetic material has decreased, increasing the magnetic field F and the output voltage of the sensor. Then, $v_0$ depends on t and $v_0(t) > v_0(0)$.

c) At any time t, if contamination has occurred, the distance between the sensor and the ferromagnetic material has increased, decreasing the magnetic field F and the output voltage of the sensor. Then, $v_0$ depends on t and $v_0(t) < v_0(0)$.

Based on cases (b) and (c), when wear or contamination, the value of $v_0$ changes. From the exemplary configuration shown in FIGS. 7 and 8, $v_0$ can have values corresponding to a Z position of z=3.7 to 6.4 mm (Δz=2.7 mm) and still give a multifeed output of at least 220 mV/mm. Accordingly, contamination and/or wear can occur without affecting the multifeed detection performance of the devices according to this invention.

The devices according to this invention can be used to detect multifeeds and improper substrate sizes for various substrate materials in an imaging apparatus. For example, the imaging substrates can comprise various types of paper, cardboard and the like. The substrates can also comprise light transparent materials, such as polymeric materials used to form transparencies. The devices according to this invention provide the advantage that it is not necessary to place a detecting strip on light transparent materials, as in conventional systems that include optical sensors, to be able to detect these materials.

The substrates can be sheets as well as envelopes and like. The substrates can have various dimensions and shapes.

It is contemplated that the devices can also be used in apparatus that feed metallic substrates, such as thin metallic sheets. In those embodiments, the giant magneto resistance effect sensor and the ferromagnetic material should be positioned so that the magnetic field emitted by the ferromagnetic material and read by the sensor is not adversely affected by the thin metallic sheet. In addition, composite materials can also be sensed with the devices.

While the invention has been described in conjunction with the specific embodiments described above, it is evident that many alternatives, modifications and variations are apparent to those skilled in the art. Accordingly, the preferred embodiments of the invention as set forth above are intended to be illustrative and not limiting. Various changes can be made without departing from the spirit and scope of the invention.

What is claimed is:

1. A device that detects a change in the distance between opposed surfaces, comprising:

a first roller having a first surface;

a second roller having a second surface relatively movable toward or away from the first surface;

a ferromagnetic material on the second roller;

a giant magneto resistance effect sensor spaced from the ferromagnetic material, the ferromagnetic material emits a magnetic field that impinges on the sensor; and a current source that applies a current to operate the sensor and reads the magnetic field emitted by the ferromagnetic material that impinges on the sensor;

wherein the magnetic field emitted by the ferromagnetic material changes when the second surface moves relatively toward or away from the first surface and changes the distance between the first and second surfaces, and the sensor detects the changes in distance between the first and second surfaces based on the change in the magnetic field.

2. The device of claim 1, wherein the second surface comprises the ferromagnetic material.

3. The device of claim 1, wherein the second surface is movable with respect to the first surface when an object passes between, and contacts, the first and second surfaces.

4. The device of claim 3, wherein the object is light transparent.

5. The device of claim 3, wherein the object comprises at least one sheet.

6. The device of claim 1, wherein the ferromagnetic material comprises a coating formed on a substrate.

7. The device of claim 1, wherein the ferromagnetic material comprises a magnet.

8. The device of claim 1, wherein the first surface and the second surface do not directly face each other.

9. An apparatus, comprising:
a feed path for conveying objects through the apparatus; and
a device that detects changes in the distance between opposed surfaces defining a portion of the feed path, the device including:
a first roller having a first surface;
a second roller having a second surface relatively movable toward or away from the first surface;
a giant magneto resistance effect sensor;
a ferromagnetic material on the second roller and spaced from the sensor, the ferromagnetic material emits a magnetic field that impinges on the sensor; and
a current source that applies a current to operate the sensor and senses the magnetic field that impinges on the sensor;
wherein the magnetic field emitted by the ferromagnetic material changes when the second surface moves relatively toward or away from the first surface and changes the distance between the first and second surfaces, and the sensor detects the change in distance between the first and second surfaces based on the change in the magnetic field.

10. The apparatus of claim 9, wherein:
the first surface is separated from the second surface by a first distance if a single object is disposed between the first and second surfaces, and the first surface is separated from the second surface by a second distance greater than the first distance if at least two objects are disposed between the first and second surfaces at the same time; and
the sensor reads a first magnetic field if the first and second surfaces are separated by the first distance, and the sensor reads a second magnetic field smaller than the first magnetic field if the first and second surfaces are separated by the second distance.

11. The apparatus of claim 9, wherein the second surface comprises the ferromagnetic material, and the first and second rollers convey the objects between them.

12. The apparatus of claim 9, wherein the second surface comprises a coating of the ferromagnetic material formed on a substrate.

13. The apparatus of claim 9, wherein the second surface comprises a magnet.

14. The apparatus of claim 9, wherein the object comprises paper sheets.

15. The apparatus of claim 9, wherein the object comprises sheets formed of a light transparent material.

16. The apparatus of claim 9, wherein the sensor can sense changes in distance between the first and second surfaces equal to at least about 0.01 mm.

17. The apparatus of claim 9, wherein the sensor can sense changes in distance between the first and second surfaces that are less than the thickness of the objects.

18. The apparatus of claim 9, wherein the first surface and the second surface do not directly face each other.

19. A method of detecting a change in distance between opposed surfaces, comprising:
applying a current to a giant magneto resistance effect sensor to operate the sensor and read a magnetic field emitted by a ferromagnetic material and that impinges on the sensor, the ferromagnetic material on a first roller;
determining a change in the magnetic field caused by the ferromagnetic material moving relatively toward or away from the sensor when an object is disposed between the ferromagnetic material and the sensor; and
relating the detected change in the magnetic field to a change in distance between a first surface of the first roller and a second surface of a second roller facing the first roller, the change in distance corresponding to a dimension of the object.

20. The method of claim 19, wherein:
the object is a single substrate and the dimension is the thickness of the substrate; and
the method further comprises determining the thickness of the substrate based on the change in distance between the first and second surfaces.

21. The method of claim 19, wherein:
the object comprises at least two substrates in an overlying arrangement; and
the method further comprises determining the presence of more than a single substrate between the first and second surfaces based on the change in distance between the first and second surfaces.

22. The method of claim 19, wherein:
the object is at least one substrate and the dimension is the thickness of the at least one substrate, the first surface is separated from the second surface by a first distance if a single substrate is disposed between, and contacts, the first and second surfaces, and the first surface is separated from the second surface by a second distance greater than the first distance if at least two substrates are disposed between, and contact, the first and second surfaces; and
the sensor reads a first magnetic field if the first and second surfaces are separated by the first distance, and the sensor reads a second magnetic field if the first and second surfaces are separated by the second distance.

23. The method of claim 19, wherein:
the object is a substrate and the dimension is the thickness of the substrate, the first surface is separated from the second surface by a first distance if the substrate has a predetermined thickness and is disposed between, and contacts, the first and second surfaces, and the first surface is separated from the second surface by a second distance different from the first distance if the substrate has a thickness different from the predetermined thickness and the substrate is disposed between, and contacts, the first and second surfaces; and
the sensor reads a first magnetic field if the first and second surfaces are separated by the first distance, and the sensor reads a second magnetic field if the first and second surfaces are separated by the second distance.

24. The method of claim 19, wherein the first and second rollers convey the object between them.

25. The method of claim 19, wherein the object comprises at least one sheet of paper.

26. The method of claim 19, wherein the object comprises at least one sheet formed of a light transparent material.

27. The method of claim 19, wherein the sensor can sense changes in distance between the first and second surfaces equal to at least about 0.01 mm.

28. The method of claim 19, wherein the object is a contaminant on at least one of the first surface and the second surface.

29. The device of claim 1, wherein the first roller and the sensor are mounted on a shaft, and the first roller and second roller directly face each other.

30. The apparatus of claim 9, wherein the first roller and the sensor are mounted on a shaft, and the first roller and second roller directly face each other.

31. The apparatus of claim 9, wherein the apparatus is an imaging apparatus that forms images on imaging substrates.

32. An imaging apparatus, comprising:
- a feed path for conveying at least one imaging substrate through the apparatus; and
- a device that detects changes in the distance between opposed surfaces defining a portion of the feed path, the device including:
  - a first roller having a first surface that faces a first side of the at least one imaging substrate;
  - a second roller having a second surface relatively movable toward or away from the first surface, the second surface faces a second side of the at least one imaging substrate;
  - a giant magneto resistance effect sensor;
  - a ferromagnetic material on the second surface of the second roller and spaced from the sensor, the ferromagnetic material emits a magnetic field that impinges on the sensor; and
  - a current source that applies a current to operate the sensor and senses the magnetic field that impinges on the sensor;

wherein the magnetic field emitted by the ferromagnetic material changes when the second surface moves relatively toward or away from the first surface when the at least one imaging substrate is conveyed between the first and second surfaces and changes the distance between the first and second surfaces, and the sensor detects the change in distance between the first and second surfaces based on the change in the magnetic field.

33. The apparatus of claim 32, wherein the first roller and the sensor are mounted on a shaft, and the first roller and second roller directly face each other.

* * * * *